(No Model.)
J. H. CALKINS.
MEANS FOR REPAIRING PNEUMATIC TIRES.
No. 574,709. Patented Jan. 5, 1897.
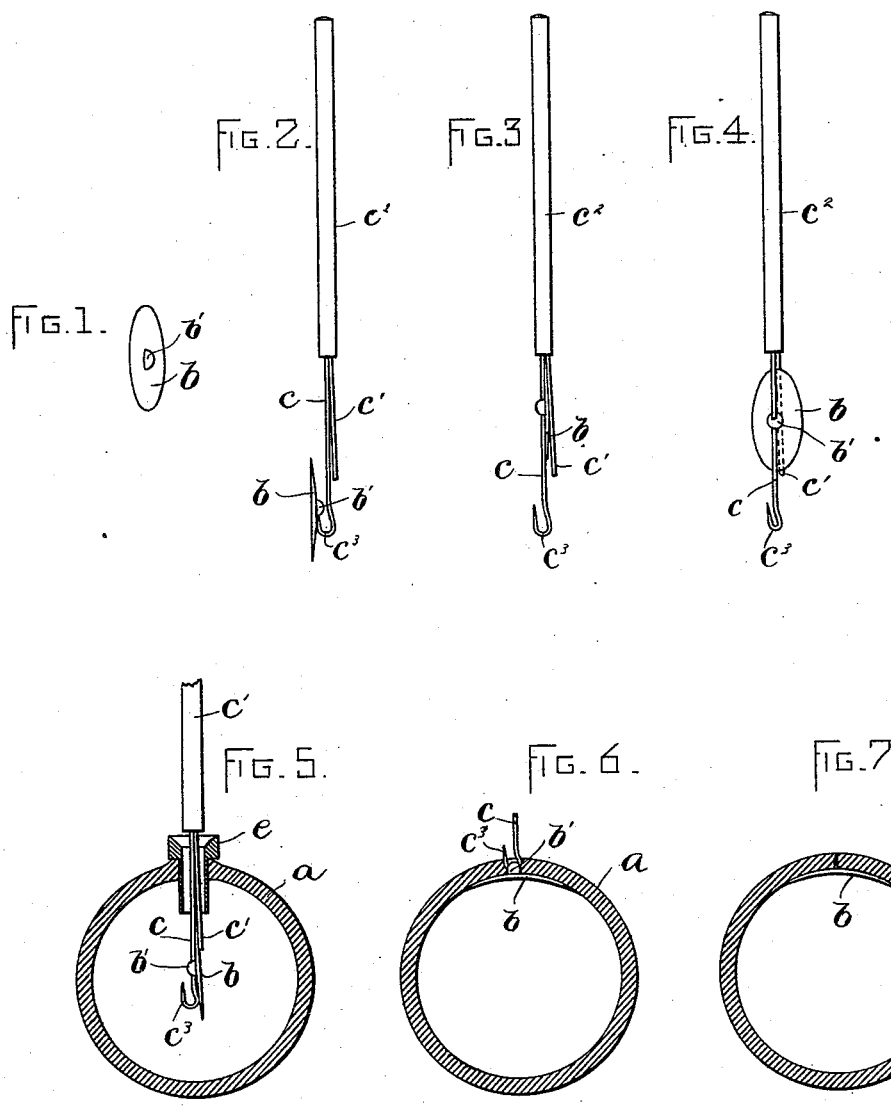
WITNESSES:
INVENTOR:

UNITED STATES PATENT OFFICE.

JAMES H. CALKINS, OF WAKEFIELD, MASSACHUSETTS.

MEANS FOR REPAIRING PNEUMATIC TIRES.

SPECIFICATION forming part of Letters Patent No. 574,709, dated January 5, 1897.

Application filed May 14, 1896. Serial No. 591,470. (No model.)

*To all whom it may concern:*

Be it known that I, JAMES H. CALKINS, of Wakefield, in the county of Middlesex and State of Massachusetts, have invented certain new and useful Improvements in Means for Repairing Pneumatic Tires, of which the following is a specification.

This invention has for its object to provide simple and effective means for repairing punctures in pneumatic tires and involves the application of a patch to the inner surface of the tire, the patch being formed to fit the tire around the puncture.

The invention consists in the improvements which I will now proceed to describe and claim.

Of the accompanying drawings, forming a part of this specification, Figure 1 represents a perspective view of the patch. Figs. 2, 3, and 4 represent views showing the tool and patch in different relative positions. Figs. 5 and 6 represent transverse sections of a pneumatic tire, illustrating the manner of inserting the patch in the tire. Fig. 7 represents a sectional view of the tire, showing the patch in position to cover a puncture therein.

The same letters of reference indicate the same parts in all the figures.

In the drawings, $a$ represents a pneumatic tire in which a puncture is supposed to have been formed.

$b$ represents a patch, which is a disk of flexible rubber or other suitable material impervious to air and adapted to be cemented to the inner surface of the tire $a$. The patch $b$ is centrally thickened at $b'$ sufficiently to enable it to be engaged at its central portion with the clamping and manipulating device hereinafter described. The marginal portion of the patch is preferably reduced to a thin edge to make it suitably flexible and enable it to conform closely to the inner surface of the tire around the puncture.

$c$ and $c'$ represent two cylindrical elongated clamping members or parts made of wire and placed side by side, so that they can embrace the patch $b$, the latter being inserted between said members, as shown in Figs. 3 and 4. The outer ends of the members $c\ c'$ are rigidly connected in any suitable way, as by a slender handle $c^2$. The inner end of the member $c$ is extended beyond the inner end of the member $c'$ and is bent to form a hook $c^3$, which is pointed at its extremity and is adapted to penetrate the thickened portion of the patch.

When a patch is to be inserted through a puncture in the tire $a$, the puncture is enlarged by means of a tube or guide $e$ inserted therein, as shown in Fig. 5. The patch is then engaged with the clamping members $c\ c'$ as follows: The thickened portion of the patch is placed upon the pointed end of the hook, as indicated in Fig. 2. The said thickened portion is pressed onto the hook and is penetrated thereby, the thickened portion being moved along the member $c$, around the bend of the hook, and upon the body portion thereof, as indicated in Figs. 3 and 4, the patch being then interposed between the members $c$ and $c'$, so that it is securely engaged with the clamping members. The patch and the clamping members are then inserted in the guide $e$, the clamping members being rotated while they are being inserted in the said guide, thus causing the patch to be wrapped around the clamping members, and thus converted into such form that it can be readily passed through the guide. After the patch has passed through the guide it assumes its normal shape and the guide is removed from the puncture, the walls of which close around the clamping members, as indicated in Fig. 6. The clamping members $c\ c'$ are then moved outwardly, the patch being pressed against the inner surface of the tire and retarded, so that the outward motion of the clamping members brings the hook $c^3$ again into engagement with the thickened portion of the patch, so that a further pull on the clamping members will press the upper surface of the patch against the inner surface of the tire. A suitable cement having been applied to the upper surface of the patch either by injecting it through the puncture or in any other suitable way, an outward pull is exerted on the clamping members sufficient to press the upper surface of the patch firmly against the inner surface of the tire, after which a more energetic pull may be exerted sufficient to break the hook away from the thickened portion of the patch. It will be seen that by this manipulation of the patch it is caused to cover a sufficient area of the inner surface of the tire surrounding the puncture to insure an air-tight closure of the puncture.

I claim—

1. A tire-repairing means comprising a centrally-thickened patch formed to fit the inner surface of the tire around a puncture therein, and a patch-manipulating device comprising two clamping members formed to embrace the patch, one of said members having a perforating-hook adapted to penetrate the thickened central portion of the patch, so that the said thickened portion may be transferred to the body portion of the said hooked member and held by the clamp while the patch is being forced through the puncture, and then transferred back to the hook and drawn outwardly against the inner surface of the tire, substantially as described.

2. The improved patch-manipulating device comprising two slender elongated clamping members suitably connected at their outer ends, the inner end of one of said members being extended beyond the inner end of the other member and provided with a penetrating-hook.

In testimony whereof I have signed my name to this specification, in the presence of two subscribing witnesses, this 7th day of May, A. D. 1896.

JAMES H. CALKINS.

Witnesses:
C. F. BROWN,
A. D. HARRISON.